Figure 1:
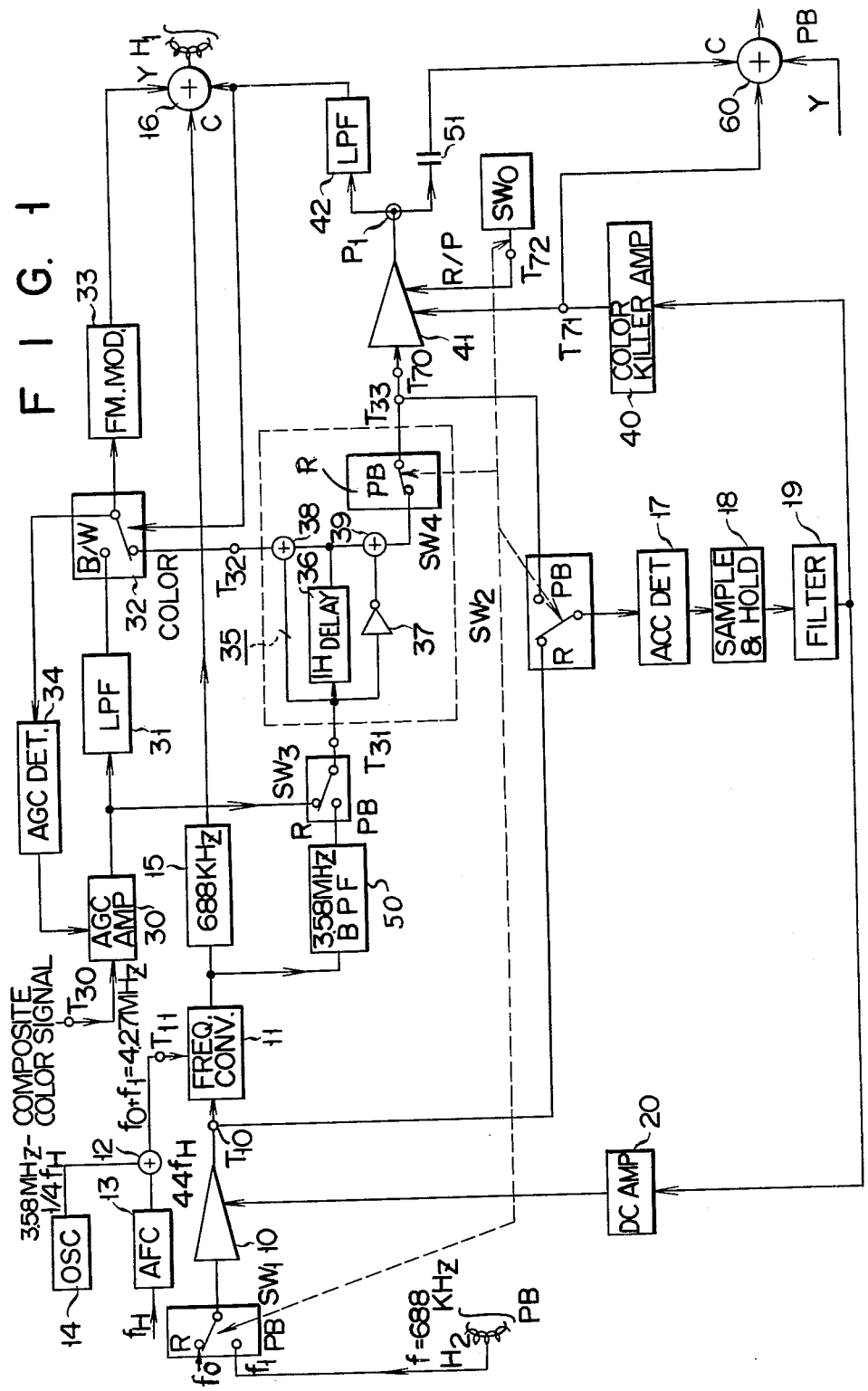

United States Patent [19]

Taguchi et al.

[11] 4,430,674
[45] Feb. 7, 1984

[54] COLOR VIDEO SIGNAL PROCESSING CIRCUIT

[75] Inventors: Shinichiro Taguchi; Nobuya Nagao; Yutaka Ogihara, all of Fukaya, Japan

[73] Assignee: Tokyo Shibaura Denki Kabushiki Kaisha, Kawasaki, Japan

[21] Appl. No.: 238,026

[22] Filed: Feb. 25, 1981

[51] Int. Cl.³ .............................................. H04N 9/49
[52] U.S. Cl. .................................................... 358/317
[58] Field of Search ....................... 358/4, 8, 21 R, 26, 358/27, 31, 317

[56] References Cited

U.S. PATENT DOCUMENTS

| 3,925,810 | 12/1975 | Ishigaki et al. | 358/4 |
| 3,947,871 | 3/1976 | Amari et al. | 358/26 X |
| 3,975,759 | 8/1976 | Taniguchi et al. | 358/26 X |
| 4,068,256 | 1/1978 | Tsuchiya et al. | 358/26 X |
| 4,077,047 | 2/1978 | Yamagiwa | 358/4 |
| 4,209,800 | 6/1980 | Yamamitsu et al. | 358/8 |

FOREIGN PATENT DOCUMENTS 2816272 10/1978 Fed. Rep. of Germany .

Primary Examiner—Aristotelis M. Psitos
Attorney, Agent, or Firm—Cushman, Darby and Cushman

[57] ABSTRACT

DC control signals responsive to ACC voltages are applied to a color signal amplifier, to which recording and reproducing color signals are applied, to control the operation of the color signal amplifier to recording or reproducing mode. Such control is attained by using color killer signal responsive to mode changeover and ACC detector signals which serve to assign the color signal amplifier to recording or reproducing mode. Color signals are obtained from the output terminal of the color signal amplifier in both modes. In the case of recording mode, essentially undesirable recording color signals appearing to the output terminal of the color signal amplifier are by-passed by a low-pass filter, and only ACC detector voltages which are used as color killer signals are supplied to a mixer circuit which mixes brightness and color signals to generate composite color signals to be recorded. This recording signal mixer circuit serves to restrain, if necessary, low frequency converted color signals from being supplied from the recording signal mixer circuit to a recording head responsive to color killer signals. In the case of reproducing mode, color signals appearing to the output terminal of the color signal amplifier are supplied to a reproducing mixer which composes composite color signals to be reproduced from brightness and color signals to be reproduced. Input signals to the color signal amplifier are treated at the time of recording mode in such a way that color killer voltages are superposed on essentially undesirable recording color signals to extract only color killer voltages on the output terminal side of the color amplifier, thus allowing the circuit, which functions as the color amplifier at the time or reproducing mode, to serve as the circuit for treating color killer signals at the time of recording mode, or making the function of the single circuit different in reproducing and recording modes.

4 Claims, 2 Drawing Figures

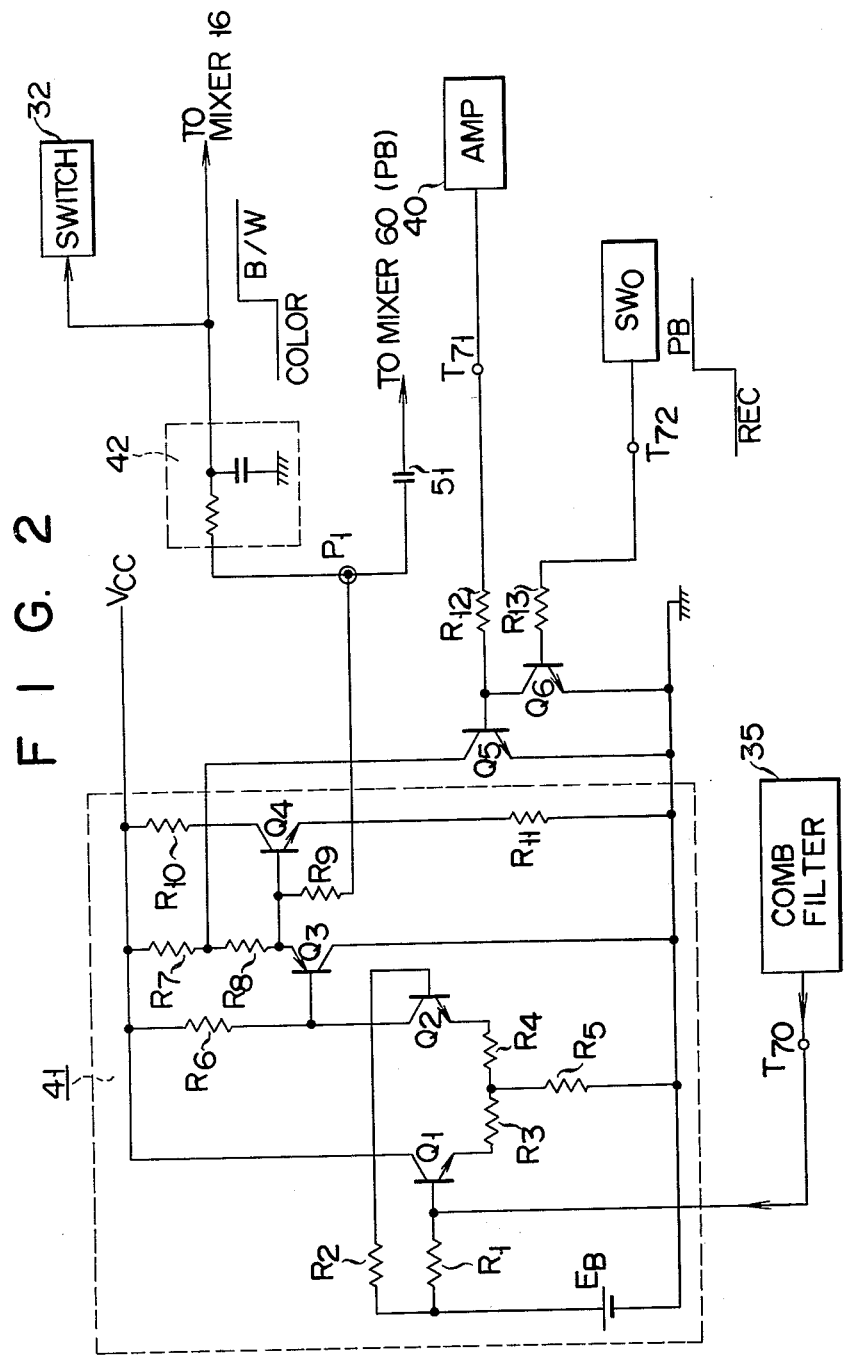
F I G. 2

COLOR VIDEO SIGNAL PROCESSING CIRCUIT

A video tape recorder (VTR) is served to record video signals onto a magnetic tape or reproduce the signals previously recorded on the magnetic tape according to a recording or reproducing mode, respectively. Known VTRs include a circuit for treating signals in the recording mode and another circuit for treating signals in the reproducing mode because the video signals are different in their characters, e.g. frequencies and levels, in recording and reproducing modes. Having the different circuits for the different modes of operation creates a problem for fabricating the circuits in a single integrated circuit (IC) chip. It is therefore desirable that one circuit can commonly operate in both modes so that the circuit may be integrated and the number of connection pins may be reduced.

The present invention relates to a circuit suitable for use in the color signal processing system of a color VTR and provides a signal processing circuit suitable for making the color VTR circuit system in IC form by reducing the number of connection pins and circuit parts and simplifying circuits and, more particularly, by the multi-functioning of the circuit.

Another object of the present invention is to provide a signal processing a circuit including circuit capable of performing two functions of a color signal amplifier in the reproducing mode and a color killer signal amplifier in the recording mode.

A further object of the present invention is to provide a signal processing circuit capable of allowing the color killer amplifier to be commonly used in recording and reproducing modes in the color VTR.

A still further object of the present invention is to provide a signal processing circuit including a circuit capable of performing two functions of comb filter, which serves to remove crosstalk components from color signals of adjacent tracks in reproducing mode and a means for separating brightness and color signals, which makes an automatic gain control (AGC) of the separated brightness signals effect and supplies the separated color signals to the circuit functioning as the color signal amplifier in recording mode.

This invention can be more fully understood from the following detailed description when taken in conjunction with the accompanying drawings, in which:

FIG. 1 is a block diagram showing a color VTR in which the signal processing circuit according to the present invention is used; and FIG. 2 is a circuit diagram of the signal processing circuit according to the present invention.

The reason why the signal processing circuit according to the present invention is useful for the VTR circuit, which operates in two modes such as recording and reproducing modes, is that the signal processing circuit is used commonly in these two modes, and that the number of connection pins is reduced at the time of being integrated, and that the VTR circuit system is stably operated. It will become apparent from the following detailed description.

FIG. 1 is a block diagram of the VTR circuit in which the signal processing circuit is employed. The incorporation of the signal processing circuit into the VTR circuit is important in that a color killer amplifier is used commonly in recording and reproducing modes, that a comb filter operates in two modes, that color killer operation is achieved through a mixer circuit of brightness and color signals, and that color killer signals are applied to a color signal amplifier at the time of recording mode.

The VTR circuit will be now described referring to the recording mode.

When a mode changeover switch $SW_0$ is turned on to recording mode, all of mode changeover circuits $SW_1$–$SW_4$ are connected to terminals R. Color signals to be recorded and whose subcarrier frequency is $f_0$ (3.58 MHz) are supplied to the terminal R of the mode changeover circuit $SW_1$, thus allowing the color signals to be supplied to an automatic color control (ACC) amplifier 10. The color signals are amplified to a predetermined level by the ACC amplifier 10. Signals $f_0$ appear therefore on the output terminal of the ACC amplifier. It is necessary to record color signals on a magnetic tape that their frequency $f_0$ (3.58 MHz) is transformed to low frequency $f_1$ (688 kHz), and this is achieved by a frequency transformer circuit 11. Signals ($f_0$) to be recorded are supplied to one terminal $T_{10}$ of the frequency transformer circuit 11, while signals whose frequency is 4.27 MHz ($=f_0+f_1$) are supplied from a frequency transformer circuit 12 to the other terminal $T_{11}$ thereof. The frequency ($f_0+f_1$) impressed to the terminal $T_{11}$ is obtained by adding signals, which are generated due to horizontal synchronizing signals in an AFC circuit 13 and whose frequency is 44 $f_H$, with outputs of an oscillator 14 in the frequency transformer circuit 12, the oscillator 14 oscillating in a fixed frequency of 3.58 MHz $-\frac{1}{4} f_H$. Signals whose frequency is $f_0$ are thus impressed to one terminal $T_0$ of the frequency transformer circuit 11 while frequency of $f_0+f_1$ to the other terminal $T_{11}$ thereof, and therefore, signals $f_1$ (688 kHz) which have been low-pass transformed are obtained from the output of the frequency transformer circuit 11. Color signals to be recorded and which have been low-pass transformed by the frequency transformer circuit 11 are supplied via a filter 15 to a mixer 16, which serves to compose color signals (C) to be recorded and brightness signals (Y). The level of color signals supplied to the mixer 16 is held constant by ACC operation due to an ACC loop formed when the $SW_2$ is connected to the terminal R. The ACC loop at the time of recording mode comprises the ACC amplifier 10, mode changeover circuit $SW_2$, an ACC detector circuit 17 of synchronizing detector type, a sampling and holding circuit 18 for sampling and holding detected outputs, a filter 19, and a DC amplifier 20.

As described above, color signals $f_0$ to be recorded are low-pass transformed to $f_1$ and supplied to the mixer 16 with their level held constant due to ACC operation.

Brightness signals (Y) at the time of recording mode will be now described. Composite color signals containing color signals to be recorded and brightness signals are impressed to the terminal $T_{30}$ of an AGC amplifier 30. The output terminal of the AGC amplifier 30 is connected to a low-pass filter LPF 31 and the terminal R of the mode changeover circuit $SW_3$. The LPF 31 is connected via a switch circuit 32 to an FM modulator 33, which serves to FM-modulate Y signals in a range of 3.5–4.8 MHz and supply them to the mixer 16. The input terminal of the FM modulator circuit 3 is selectively connected to the low-pass filter 31 and a comb filter 35 by means of a switch circuit 32 which is controlled by color killer signals as will be described later. Selective connection of this switch circuit 32 serves to change over the first ACC loop through which composite color signals flow from a second AGC loop comprising the AGC amplifier 30, low-pass filter 31, switch circuit 32 and an AGC detector circuit 34 to another AGC loop comprising the AGC amplifier 30, comb filter 35 and AGC detector circuit 34 and vice versa. Changeover of these two AGC loops at the time of recording mode means that the comb filter 35 is used as a means for separating brightness signals from color signals when color killer operation is not needed but is removed from the AGC loop when color killer operation is needed. Operation of the comb filter 35 will be further described. The comb filter 35 comprises the mode changeover circuit $SW_4$ which changes over mode instantly responsive to the switching of the mode changeover switch circuit $Sw_0$, an 1H delay line 36, an inverter 37 and adders 38, 39. The comb filter 35 at the time of recording mode supplies to a terminal $T_{32}$ the sum of composite color signals impressed to a terminal $T_{31}$ and signals obtained by 1H-delaying composite color signals, while to a terminal $T_{33}$ the sum of composite color signals and signals obtained by inverting composite color signals. Brightness signals and color signals contained in composite color signals are in frequency interleaving relation and therefore, brightness signals are obtained from the terminal $T_{32}$ while color signals from the terminal $T_{33}$ at the time of recording mode. Namely, the comb filter 35 functions at the time of recording mode to separate brightness and color signals from composite color signals.

Attention should be paid to the matter that when the switch circuit 32 is switched to B/W mode by the color killer signal generated in a color killer amplifier 40, the first AGC loop is formed by the AGC amplifier 30, low-pass filter 31 and AGC detector circuit 34 leaving the comb filter 35 off from separation of brightness and color signals. Brightness signals are separated from composite color signals in this case by extracting through the low-pass filter 31 only brightness signal components whose frequency is lower than that of color signals.

Attention should be further paid to the matter that those two AGC loops are changed over responsive to the level of color signals though the color killer signal generated in the color killer amplifier 40 is a control signal for preventing color signals in the mixer 16 from being supplied to a recording head $H_1$ when the level of color signals is lower than the predetermined one. In other words, the matter that the color killer signal is used as a control signal for determining whether or not the comb filter is employed to separate brightness signals from composite color signals can be achieved by incorporating the signal processing circuit of the present invention into the VTR circuit.

It will be now described that color killer signals obtained by the color killer amplifier 40 are effectively used by the present invention.

The color killer amplifier 40 is a DC amplifier to which control signals obtained through the filter 19 to control the ACC amplifier 10 are applied as inputs. As already described above, it is necessary at the time of recording mode to supply outputs of this color killer amplifier 40 to the mixer 16 and the switch circuit 32. Output signals of the color killer amplifier 40 are not impressed direct to the mixer circuit 16 and the switch circuit 32, but through a color amplifier 41 and a low-pass filter 42 in this case. It is aimed to commonly use the color killer amplifier 40 in reproducing mode. It is further aimed to reduce the number of pins at the time of being integrated by usefully using even in reproducing mode the color amplifier which is not essentially needed in recording mode. It is still further aimed to achieve color killer operation in the mixer stage. It is still further aimed to use outputs of the color killer amplifier 40 to control whether or not the comb filter is employed as a means for separating brightness and color signals. It is still further aimed to enable the comb filter 35 to be used as a means for separating brightness and color signals at the time of recording mode and for removing crosstalk components in signals recorded by crosstalk on adjacent tracks at the time of reproducing mode.

These matters will become apparent from the following description.

The color amplifier 41 is needed only in reproducing mode to make color signals obtained from the tape through the reproducing head to a high level of signals, but not essentially in recording mode. However, the operation of the color amplifier 40 shown in FIG. 1 will be described in recording mode. As described above at the time of recording mode, color signals separated from composite color signals by the comb filter 35 are impressed to the input terminal of the color amplifier 41. Impressed to the color amplifier 41 are color killer signals of DC type obtained from the output of the color killer amplifier 40. As the result, a signal obtained from superposing the color killer signal of DC type on the color signal appears at the output of the color amplifier 41 in recording mode. This superposed signal is impressed to the low-pass filter 42. Of superposed signals, color signals low-pass transformed and having frequency of $f_1$ are by-passed by the low-pass filter 42. Therefore, impressed to the mixer 16 having the color killer switch circuit 32 are only color killer signals obtained through low pass filter 42.

As described above, the color amplifier has color killer signal transmission function in recording mode, said function being essentially different from its reproducing mode operation to amplify color signals. Therefore, the color amplifier 41 which is not essentially needed in recording mode is usefully used as the color killer signal transmission circuit to thereby provide multi-function of the same circuit. This means that the color killer amplifier 40 itself, which is essentially needed in recording and reproducing modes, can be commonly used in both modes. As described above, the control signal of the color killer amplifier 40 controls the switch circuit 32 as well as color killer operation in the mixer circuit 16 in recording mode. When the switch circuit 32 is switched to B/W mode in this case, brightness signals are extracted by by-passing color signals through the low-pass filter 31. Brightness signals extracted this time are B/W signals for high resolution because the comb filter 35 which causes deterioration of resolution is not used.

Description has been made about the color VTR circuit shown in FIG. 1 and switched to recording mode, and will be now made about the usefulness of the color VTR circuit shown in FIG. 1 but switched to reproducing mode, said color VTR circuit including the signal processing circuit according to the present invention.

All of the mode changeover circuits $SW_1$-$SW_4$ are connected to terminals PB by switching the mode changeover switch circuit $SW_0$ to reproducing mode. Color signals $f_1$ to be reproduced are impressed from a head $H_2$, which operates in reproducing mode, through the mode changeover circuit $SW_1$, which has been switched to reproducing mode, to the ACC amplifier 10 at the time of reproducing mode. Frequency of color signals obtained from the magnetic tape through the head is $f_1$ which is low-pass transformed at the time of recording mode. Reproducing color signals $f_1$ appearing to the output of the ACC amplifier 10 through the head are impressed to the terminal $T_{10}$ of the frequency transformer circuit 11. Signals ($f_0+f_1=4.27$ MHz) are applied to the terminal $T_{11}$ of the frequency transformer circuit 11 in both recording and reproducing modes. Therefore, reproducing color signals applied to the terminal $T_{10}$ of the frequency transformer circuit 11 and having frequency $f_1$ are transformed to have frequency of $f_0=3.58$ MHz. Reproducing color signals whose frequency has been thus transformed to $f_0$ are applied via a 3.58 MHz band-pass filter BPF 50 and the mode changeover switch circuit $SW_2$, which has been switched to reproducing mode, to the terminal $T_{31}$ of the comb filter 35. The mode changeover switch circuit $SW_4$ arranged in the comb filter 35 is now switched to reproducing mode. Therefore, the comb filter 35 serves to add signals applied to the terminals $T_{31}$ with signals, which are obtained by delaying only by 1 H signals applied to the terminal $T_{31}$, and supply them to the terminal $T_{33}$ in reproducing mode. Color signals are recorded on the tape at the time of recording mode in such a way that they are inverted in phase every 1 H relative to a track A of adjacent tracks A and B. The phase of crosstalk components mingled from the track B to the track A is equal this time to that of color signals in the track B. The phase of crosstalk components mingled from the track A to the track B is also equal to that of color signals in the track A. Therefore, the comb filter 35 which functions to delay signals by 1 H at the time of reproducing mode serves to remove crosstalk components at the time of reproducing mode.

Reproducing color signals whose crosstalk components have been removed and which are obtained from the terminal $T_{33}$ of the comb filter 35 are supplied to the color amplifier 41 so as to be amplified to a predetermined level. Color signals amplified by the color amplifier 41 are supplied via a capacitor 51 to a mixer 60, which serves to mix reproducing color and brightness signals. Signals of the color killer amplifier 40 are also applied to the color amplifier 41, but signals which have been applied to the color amplifier 41 are amplified regardless of the level of output signals of the color killer amplifier 40, as will be described later referring to FIG. 2, and then supplied via the capacitor 51 to the mixer circuit 60. Outputs of the color killer amplifier 40 are applied to the color amplifier 41 and also supplied to the mixer circuit 60.

Color killer operation at the time of reproducing mode is achieved by the switch circuit (not shown) in the mixer circuit 60 responsive to the color killer signal supplied to the mixer 60 from the color killer amplifier 40.

ACC operation at the time of reproducing mode is achieved by a loop comprising the ACC amplifier 10, frequency transformer circuit 11, band-pass filter BPF 50, mode changeover switch circuit $SW_3$, comb filter 35, mode changeover switch circuit $SW_2$, ACC detector 17, sampling and holding circuit 18, filter 19 and DC amplifier 20.

As described above, ACC control signals are used as color killer signals, the color killer amplifier 40 is commonly used in both recording and reproducing modes, and the color amplifier 40 is used at the time of recording mode as a means for transmitting color killer signals, thus enabling the number of pins to be reduced on the output side of the color amplifier 41. This is an effect attained by employing the signal processing circuit of the present invention as the color amplifier of the color VTR. If the signal processing circuit of the present invention is not employed as the color amplifier, color killer amplifiers must be separately arranged in recording and reproducing modes. Two pins will be therefore needed to introduce color killer signals to a circuit having a switch for use in recording mode and another circuit having another switch for use in reproducing mode. A pin will also be needed to introduce outputs of the color amplifier to the mixer circuit for use in reproducing mode. These pins can be simplified to the output terminal pin $p_1$ of the color amplifier 41 in the circuit shown in FIG. 1. According to the present invention color killer signals are supplied via the pin $P_1$ to the mixer circuit 16 and also skillfully supplied to the switch circuit 32 at the time of recording mode, so that selection to determine whether or not the comb filter is employed to separate brightness signals from composite color signals in recording mode can be achieved in addition to color killer operation.

FIG. 2 shows a circuit diagram showing the signal processing circuit of the present invention employed as the color amplifier 41 shown in FIG. 1. Terminals $T_{70}$, $T_{71}$ and $T_{72}$ shown in FIG. 2 correspond to those shown in FIG. 1. Same parts as those shown in FIG. 1 are represented by same numerals.

The input terminal $T_{70}$ of the color amplifier 41 is connected to the base of a transistor $Q_1$ in a differential amplifier, which comprises a differential pair of transistors $Q_1$, $Q_2$, resistors $R_1-R_5$ and a resistor $R_6$. A power source $E_B$ is connected via resistors $R_1$ and $R_2$ to the bases of transistors $Q_1$ and $Q_2$, respectively. A transistor $Q_3$ whose emitter is connected to resistors $R_7$ and $R_8$ is connected to the resistor $R_6$ which is connected to the transistor $Q_2$. The base of a transistor $Q_4$ is connected to the emitter of the transistor $Q_3$, and the base and emitter of the transistor $Q_4$ are connected each other via a resistor $R_9$. A resistor $R_{10}$ is connected to the collector of the transistor $Q_4$ and a resistor $R_{11}$ to the low potential emitter of the transistor $Q_4$. The collector and emitter of a transistor $Q_5$ are connected to the connection point of resistors $R_7$ and $R_8$ and between reference potentials. The base of the transistor $Q_5$ is connected via a resistor $R_{12}$ to the terminal $T_{71}$ to which output signals of the color killer amplifier 40 are applied. The collector and emitter of a transistor $Q_6$ are connected to the base of the transistor $Q_5$ and between reference potentials, respectively. The base of the transistor $Q_6$ is connected via a resistor $R_{13}$ to the output terminal $T_{72}$ of the mode changeover switch circuit $SW_0$. Connected to the output terminal $P_1$ of the color amplifier 41 are the low-pass filter 42 and capacitor 51, as described in FIG. 1.

The circuit shown in FIG. 2 will be described in recording mode. Outputs of the mode changeover switch $SW_0$ or voltages of the terminal $T_{72}$ are in low level and the transistor $Q_6$ is under OFF-condition in recording mode. Therefore, the transistor $Q_5$ achieves switching operation responsive to the voltage level of outputs of the color killer amplifier 40 (FIG. 1). When color signals are treated without color killer operation in recording mode, the voltage level of the output terminal $T_{71}$ of the color killer amplifier 40 is high. On the contrary, when color killer operation is carried out, the voltage level of the terminal $T_{71}$ is low. Attention should be paid here to the matter that voltages of the terminal $T_{71}$ (or output voltages of the color killer amplifier 40) are in low level and the transistor $Q_5$ is under OFF-condition when color killer operation is carried out at the time of recording mode. When this transistor $Q_5$ is under OFF-condition, color signals applied from the terminal $T_{70}$ and separated from composite color signals by means of the comb filter 35 (FIG. 1) are supplied from the output terminal of the differential amplifier through the transistor $Q_3$ of emitter follower type and then through the transistor $Q_4$ to the terminal $P_1$. Color signal components ($f_0=3.58$ MHz) of signals supplied to the terminal $P_1$ this time are by-passed by the low-pass filter 42, and a V killer of DC type is obtained from the output of the low-pass filter. The switch (not shown) arranged in the mixer circuit 16 is rendered operative and the switch circuit 32 is switched to B/W mode by this V killer of DC type.

When color signals are recorded without color killer operation in recording mode, the transistor $Q_5$ is under ON-condition. Namely, when no color killer operation is carried out, voltages of the terminal $T_{71}$ is in high level keeping the transistor $Q_5$ ON and transistors $Q_3$, $Q_4$ OFF. The potential of the terminal $P_1$ becomes substantially grounded this time. Therefore, when no color killer operation is carried out and the switch circuit 32 is switched to color mode in recording mode, the voltage level of the terminal $P_1$ becomes low.

As described above, color signals to be recorded on the tape are not obtained from the color amplifier 41 but from the filter 15 (FIG. 1) of $f_1=688$ kHz in recording mode.

Reproducing mode operation will now be described with reference to the circuit shown in FIG. 2.

The voltage level of the terminal $T_{72}$ is made high in reproducing mode by switching the mode changeover switch circuit $SW_0$ to reproducing mode. The transistor $Q_6$ is thus turned ON. As the result, the transistor $Q_5$ is kept OFF no matter how voltages of the output terminal $T_{71}$ of the color killer amplifier 40 may take any values. Therefore, color signals to be reproduced and obtained from the comb filter 35 (FIG. 1) at the time of reproducing mode are applied to the terminal $T_{70}$, amplified by the color amplifier 41, and supplied via the terminal $P_1$ and capacitor 51 to the mixer circuit 60, which serves to mix brightness and color signals to be reproduced. And the switch circuit (not shown) included in this mixer circuit 60 is rendered operative responsive to voltages of the output terminal $T_{71}$ of the color killer amplifier 40 to effect color killer operation on reproducing color signals at the time of reproducing mode.

What we claim is:

1. A color video signal processing circuit suitable for carrying out a color killer operation control of a color video tape recorder (VTR), comprising:

an automatic color control (ACC) amplifier connected to receive a color signal generated in either a recording or a reproducing mode of operation of said VTR;

An ACC detector for detecting the level of an output signal of said ACC amplifier;

an ACC control signal amplifier for supplying a gain control signal, corresponding to an output of said ACC detector, to a gain control input of said ACC amplifier for controlling the level of its output signal to a predetermined value;

a signal switching circuit connected to receive said output signal of said ACC amplifier when said VTR is operating in its reproducing mode, and having first and second control signal inputs for controlling its output signal according to control signals applied thereto;

a color killer amplifier coupled to receive an output signal of said ACC detector for supplying a color killer signal to said first control signal input of said signal switching circuit;

a mode switching circuit coupled to supply a signal of a level corresponding to either the recording or reproducing mode of operation of said VTR to said second control signal input of said signal switching circuit;

a reproducing color signal transmitting means for reproducing a color signal from the output of said signal switching circuit;

a reproducing signal mixing circuit for mixing the color signal from the reproducing color signal transmitting means with a reproducing brightness signal;

means for interrupting a signal transmission path of the reproducing color signal transmitting means during reproducing mode operation according to the output of the color killer amplifier;

recording color signal transmitting means for transmitting a recording color signal obtained from said ACC amplifier during recording mode operation of said VTR;

recording signal mixing circuit for mixing said recording color signal from said transmitting means with a recording brightness signal; and means for interrupting a signal transmission path through which a recording color signal is transmitted to the recording signal mixing circuit according to a DC voltage obtained from said signal switching circuit during recording mode operation, wherein said signal switching circuit provides only a color killer signal during recording mode operation responsive to the output of the color killer amplifier and provides a reproducing color signal with a predetermined controlled gain through the ACC operation according to the output of the color killer amplifier during reproducing mode operation.

2. A color video signal processing circuit according to claim 1, further comprising means for obtaining a recording signal from a composite recording signal at the time of recording, said means being connected such that it performs an automatic gain control (AGC) operation with respect to the composite recording signal when a color killer signal is amplified by said color killer amplifier and appears at an output of said signal switching circuit, and it performs an AGC operation with respect to a signal obtained by eliminating the color signal from the composite recording signal through a comb filter, when no color killer signal is present.

3. A signal processing circuit for use in both record and playback modes of operation of a video type recorder (VTR) comprising:

a signal gate circuit for (a) receiving a color video signal to be recorded on a storage medium during record mode operation or read from said storage medium during playback mode and (b) selectively transmitting a signal corresponding to said color video signal to an output thereof responsive to a control signal applied to a control signal input thereof;

AC signal bypassing means coupled to the output of said signal gate circuit for bypassing an AC signal component thereof;

a first signal transmission path coupled to an output of said AC signal bypassing circuit for conducting a color killer signal when said VTR is operating in its record mode;

a second signal transmission path connected to the output of said signal gate circuit for blocking a DC signal component and conducting said color signal during playback mode operation of said VTR;

a control signal generating circuit for supplying a first or second control signal to said control signal input of said signal gate circuit for controlling said signal gate circuit; and mode switching means for switching to operate said VTR in a first mode in which said first or second control signal is impressed upon said control signal input and a second mode in which said control signal input terminal is held at a predetermined potential and the voltage at the output terminal of said signal gate circuit is made constant independent of the output of said control signal generating circuit.

4. A color video signal processing circuit suitable for carrying out a color killer operation control of a color video tape recorder (VTR), comprising:

an automatic color control (ACC) amplifier having an input for receiving a color signal generated in either a recording or a reproducing mode of operation of said VTR;

means for converting an output color signal of said automatic color control (ACC) amplifier into a low frequency color signal suitable for recording said output color signal on magnetic tape;

means for selectively receiving the output signal of said ACC amplifier and a composite color signal containing a color signal to be recoded and a brightness signal and for producing a recording color signal in response thereto;

an ACC detector for detecting the level of an output signal of said ACC amplifier;

changeover means for selectively coupling the output color signal of said ACC amplifier and said recording color signal with said ACC detector;

an ACC control signal amplifier for supplying a gain control signal, corresponding to an output of said ACC detector, to a gain control input of said ACC amplifier for controlling the level of its output signal to a predetermined value;

a signal switching circuit connected to receive said recording color signal when said VTR is operating in its reproducing mode, and having first and second control signal inputs for controlling its output signal according to control signals applied thereto;

a killer amplifier coupled to receive an output signal of said ACC detector for supplying a color killer signal to said first control signal input of said signal switching circuit;

a mode switching circuit coupled to supply a signal of a level corresponding to either a recording or reproducing mode of operation of said VTR to said second control signal input of said signal switching circuit;

a reproducing color signal transmitting means for transmitting a reproducing color signal obtained from the output of said signal switching circuit;

a reproducing signal mixing circuit for mixing the reproducing color signal from the reproducing color signal transmitting means with a reproducing brightness signal;

means for interrupting a signal transmission path of the reproducing color signal transmitting means during reproducing mode operation according to the output of the color killer amplifier;

recording color signal transmitting means for transmitting said recording color signal obtained from said recording color signal producing means during recording mode operation of said VTR;

recording signal mixing circuit means for mixing said recording color signal from said transmitting means with a recording brightness signal; and means for interrupting a signal transmission path through which said recording color signal is transmitted to the recording signal mixing circuit means according to a DC voltage obtained from said signal switching circuit during recording mode operation, wherein said signal switching circuit provides only a color killer signal during recording mode operation responsive to the output of the color killer amplifier and provides a reproducing color signal with a predetermined controlled gain through the ACC operation according to the output of the color killer amplifier during reproducing mode operation.

* * * * *